United States Patent
Smith et al.

(10) Patent No.: US 12,472,530 B2
(45) Date of Patent: *Nov. 18, 2025

(54) AUTOMATED TWO-COMPONENT RESIN MIXING AND DISPENSING SYSTEM

(71) Applicant: SWIMC LLC, Cleveland, OH (US)

(72) Inventors: Kyle Sanford Smith, South Windsor, CT (US); Murty Venkata Bhamidipati, Simsbury, CT (US); David Royston Hughes, Fairfield, CT (US); Robert S. Smith, South Windsor, CT (US); Peter V. Ferris, Hartford, CT (US); Daniel R. Allen, Glastonbury, CT (US); Charles R. Sperry, Chester, CT (US); David M. Kroll, Westfield, MA (US)

(73) Assignee: SWIMC LLC, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/598,734

(22) Filed: Mar. 7, 2024

(65) Prior Publication Data

US 2024/0207888 A1 Jun. 27, 2024

Related U.S. Application Data

(63) Continuation of application No. 17/271,160, filed as application No. PCT/US2019/047907 on Aug. 23, 2019, now Pat. No. 11,951,505.

(Continued)

(51) Int. Cl.
*B05C 11/00* (2006.01)
*B01F 23/45* (2022.01)
(Continued)

(52) U.S. Cl.
CPC .......... *B05C 11/1036* (2013.01); *B01F 23/45* (2022.01); *B01F 25/4314* (2022.01); *B01F 33/5023* (2022.01); *B01F 35/8311* (2022.01)

(58) Field of Classification Search
CPC ... B05C 11/1036; B01F 23/45; B01F 25/4314
See application file for complete search history.

(56) References Cited

U.S. PATENT DOCUMENTS 10,434,525 B1 10/2019 Cooper
2008/0000928 A1 1/2008 Choiniere et al.
(Continued)

OTHER PUBLICATIONS

PCT, International Search Report and Written Opinion issued in Applicaiton No. PCT/US19/47907, mailed Apr. 8, 2020, 15 pgs.

*Primary Examiner* — Anshu Bhatia
(74) *Attorney, Agent, or Firm* — Honigman LLP

(57) ABSTRACT

According to some embodiments, a system and method for dispensing a floor coating in a specified ratio of multiple components is disclosed. The system and method may set and maintain a desired ratio of the multiple components by controlling, with a controller, a drive rate of respective pumps configured for propelling the components from a reservoir to a mixer or a dispenser. The controller may be responsive to at least one of a measured actual drive rate, an environmental condition, an actual usage of each component, and an operational parameter of the system, for adjusting a drive rate of the respective pumps to compensate for discrepancies that may affect the ratio of the multiple components.

16 Claims, 10 Drawing Sheets

Related U.S. Application Data

(60) Provisional application No. 62/722,916, filed on Aug. 26, 2018.

(51) Int. Cl.
    *B01F 25/4314*     (2022.01)
    *B01F 33/502*     (2022.01)
    *B01F 35/83*     (2022.01)
    *B05C 11/10*     (2006.01)

(56) References Cited

U.S. PATENT DOCUMENTS

| | | |
|---|---|---|
| 2011/0160919 A1 | 6/2011 | Orr et al. |
| 2012/0282121 A1* | 11/2012 | Kieffer ............... F04B 17/03 417/410.1 |
| 2014/0193630 A1 | 7/2014 | Lewis et al. |
| 2016/0107179 A1* | 4/2016 | McAndrew ......... B05B 12/1418 239/75 |

* cited by examiner

AUTOMATED TWO-COMPONENT RESIN MIXING AND DISPENSING SYSTEM

CROSS-REFERENCE TO RELATED APPLICATIONS

This Application is a Continuation of application Ser. No. 17/271,160 filed on Aug. 23, 2019, which is a national stage application of and claims priority to Patent Cooperation Treaty (PCT) Application No. PCT/US2019/047907 filed Aug. 23, 2019, which claims the benefit of U.S. Provisional Patent Application No. 62/722,916 filed Aug. 26, 2018, the entire contents of each application listed above are incorporated herein by reference.

BACKGROUND OF THE DISCLOSURE

High performance resin flooring systems are used in a variety of settings, including commercial, industrial and healthcare facilities, and the like. Various resins are used, some of the most common being epoxy, urethane and methyl methacrylate (MMA) resins. These are typically 2 to 4 component resins systems, using a resin and hardener and a possible aggregate or a colorant that must be accurately measured and mixed immediately prior to application. Due to rapid cure time, these coatings are typically mixed and used in multiple small batches. As working times for coatings of this type are generally less than 20 minutes, batches must be small enough that they can be poured, spread and rolled during that time.

Depending on the flooring system used, a finished floor may require, e.g., 1 or 2 coats of primer, and 2 to 3 finish coats. Coverage per batch generally varies between about 30 $ft^2$ to 350 $ft^2$, depending on the resin system used. As an example, commercially available Dur-A-Flex Accelera B requires a primer coat, two broadcast coats and a topcoat. Different resins and hardeners lead to different coverages, and in this flooring system, the coating coverages ranges between 65 $ft^2$ and 115 $ft^2$ per batch. Finishing a relatively small 400 $ft^2$ floor with this product requires the preparation of 22 resin batches. Large scale flooring projects, such as warehouses, grocery stores and health care facilities, can require hundreds of batches to complete.

Measuring, mixing and dispensing flooring coating components currently are performed manually. First, a mix station is set up. This consists of laying down a protective covering, such as corrugated cardboard, on a section of floor that is out of the way of the area being coated. All the needed supplies are laid out in the mix area, including the measuring and mixing buckets, resin and hardener supply, power mixer, mixing sticks, etc. Resin and hardener are measured and combined in a mixing bucket, then mixed with the power mixer for approximately 30 seconds. The prepared coating mix is then hand carried to the area being coated, poured onto the floor and spread to the desired thickness using spreaders and/or rollers. This manual mixing and spreading process is labor intensive and can require a crew of 5 or more employees.

Since product is mixed and measured manually, the process is susceptible to human error. As more batches are required, the possibility of incorrectly mixed batches increases. For example, product may be mixed at the incorrect ratio of resin to hardener, resulting in a floor coating that is either soft or brittle. Also, there is the possibility that incorrect or incompatible resin and hardener are selected and mixed.

Further, when coating a floor in a large facility, there may be a substantial distance between the mix station and the floor being coated, requiring buckets of mixed product to be hand carried back and forth, adding the possibility of spillage and waste, as well as consuming working time. With some resin products, the ratio of resin to hardener varies with temperature, adding an additional variable. There is also a great deal of cleanup required with this process.

In view of the above, it can be seen that there is a need in the floor coating industry, and other industries, for an improved method of accurately measuring, mixing and delivering multi-component coatings products.

BRIEF DESCRIPTION

In an aspect, the disclosure relates to a multi-component coating dispensing system, comprising a first pump, a second pump, and a controller. The first pump is in fluid communication with a first reservoir containing a first coating component and configured for propelling at a first specified drive rate the first coating component received at an inlet of the first pump. The second pump is in fluid communication with a second reservoir containing a second coating component and configured for propelling at a second specified drive rate the second coating component received at an inlet of the second pump. The controller is configured for determining the first specified drive rate and the second specified drive rate based at least in part on providing from the first pump and the second pump a desired ratio of the first coating component to the second coating component.

In another aspect, the disclosure relates to a method for dispensing a multi-component coating, comprising setting, with a controller, a first specified drive rate for a first pump and a second specified drive rate for a second pump and placing a first reservoir containing a first coating component in fluid communication with the first pump and a second reservoir containing a second coating component in fluid communication with the second pump. The method includes propelling at the first specified drive rate the first coating component received at an inlet of the first pump and propelling at the second specified drive rate the second coating component received at an inlet of the second pump. Further, setting the first specified drive rate and the second specified drive rate is based at least in part on providing from the first pump and the second pump a desired ratio of the first coating component to the second coating component.

In another aspect, the disclosure relates to a multi-component coating dispensing system, comprising a first pump configured for propelling at a first specified drive rate a first coating component and a second pump configured for propelling at a second specified drive rate a second coating component. A controller is configured for determining and adjusting the first specified drive rate and the second specified drive rate for providing from the first pump and the second pump a desired ratio of the first coating component to the second coating component.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Figure 1A:
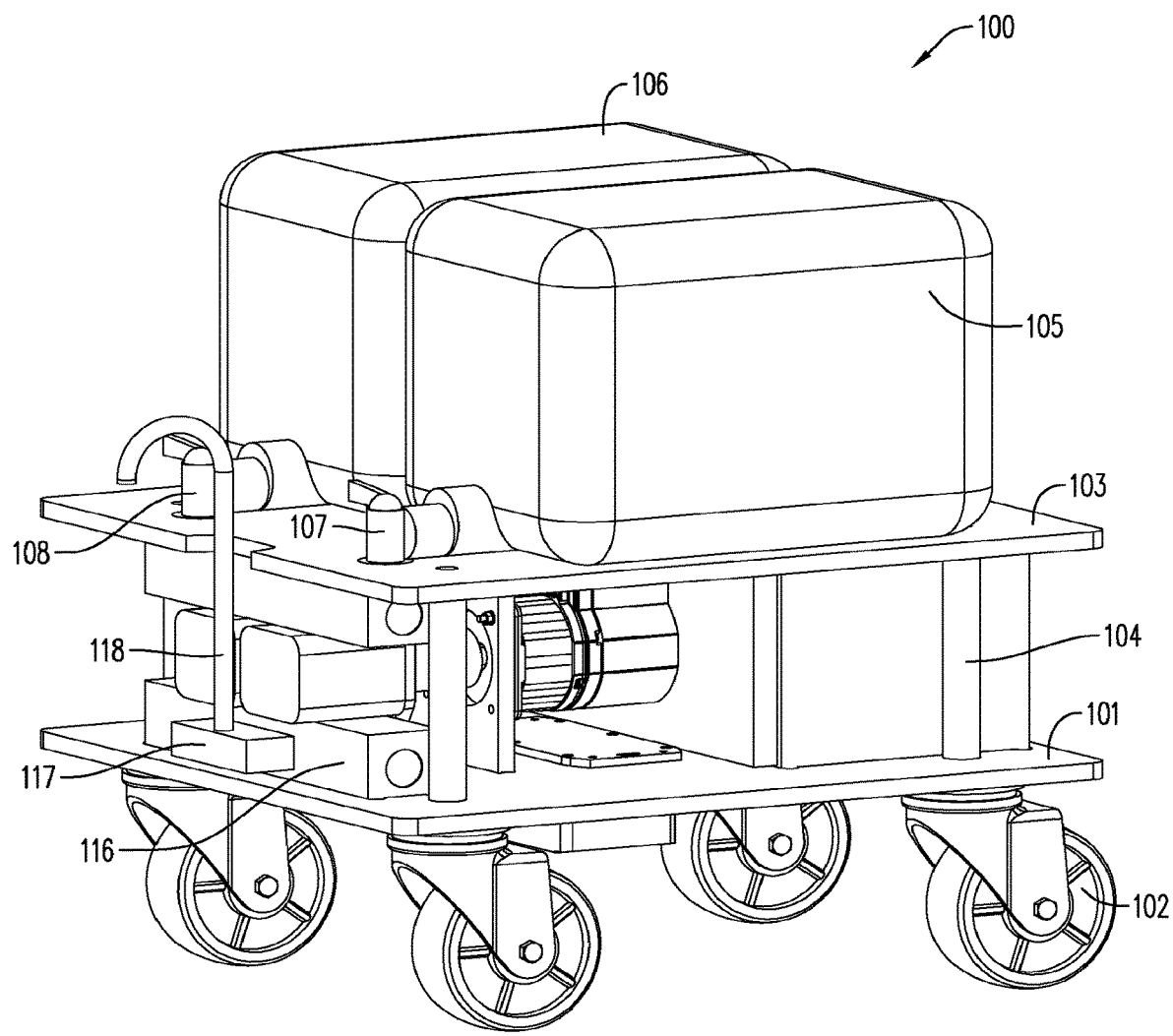
FIG. 1A illustrates an isometric view of the general layout of an exemplary embodiment of the disclosed system.
Figure 1B:
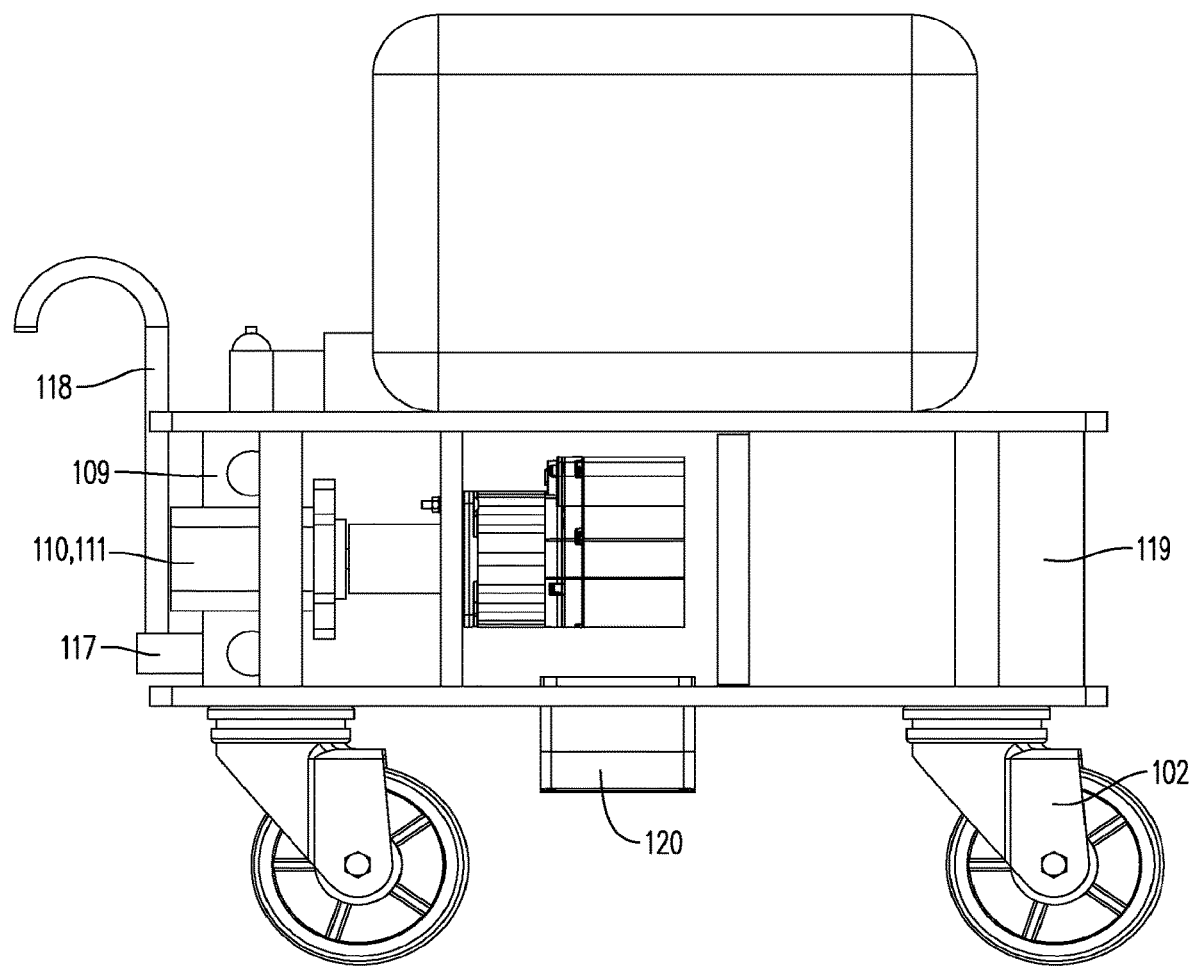
FIG. 1B illustrates a side view of the general layout of an exemplary embodiment of the disclosed system.
Figure 1C:
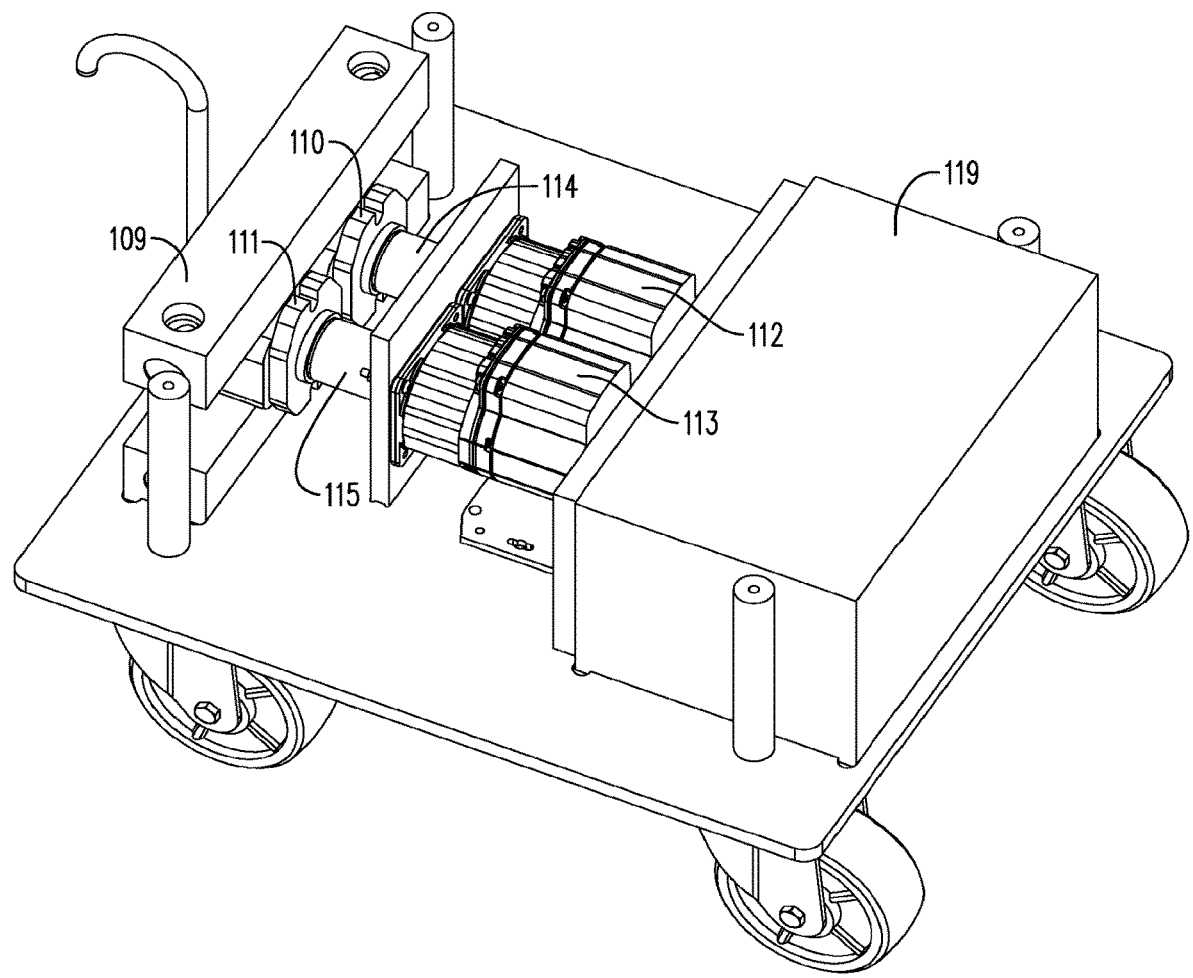
FIG. 1C illustrates an angle view of an exemplary embodiment of the disclosed system with some components removed for clarity.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

Provided, among other things, is a system that automates the delivery, in measured amounts, of the components of a multi-component coating composition, such as coating compositions useful in e.g., flooring.

For purposes of this disclosure, the term "system pump" refers to a pump used to move the coating components or mixed coating and differentiates any other pumps that may be incorporated into the present dispenser system. Similarly, "pump motors" refers to the motors used to drive the "system pumps" and differentiates any other motors that may be incorporated into the present dispenser system, e.g., a motor used to propel the present device across the floor. "Pump" and "motor" are occasionally used herein to refer respectively to a "system pump" and "pump motor", but the context in which the simple terms are used will make clear the meaning.

The present disclosure provides, among other things, dispensing devices, systems, and methods related to the measuring, mixing, and delivery of coating components. The exemplary embodiments typically incorporate a portable system that automates the measuring and delivery of coating components, and in certain embodiments also automates the mixing process of multiple component resin systems, e.g., two component coating systems comprising a curable resin and a hardener. For purposes of this disclosure, the phrases "devices," "systems," and "methods" may be used either individually or in any combination referring without limitation to disclosed components, grouping, arrangements, steps, functions, or processes.

An exemplary portable dispenser system of the present disclosure for dispensing multi-component resin compositions comprises: two or more system pumps for pumping components of the multi-component coating composition, two or more pump motors, wherein each system pump is individually coupled to one of the pump motors, a controller to drive the pump motors at rates so that the pumps deliver the resin components in the proper ratio, sensors that provide environmental and operational data to the controller so that the controller may adjust, if necessary, the pump rates and/or resin component ratios based on the environmental and operational data provided, and in certain embodiments the dispensing system will comprise a mixer to mix the coating components and typically reservoirs from which the coating components are provided to the system.

Also provided is a method for preparing accurately measured multi-component coating compositions, comprising a curable resin and hardener, useful for application to a flooring or other surface, which method requires reduced manpower, for example, a floor coating operation that currently requires up to 5 persons may now often be accomplished with one or two persons.

The dispensing system of the disclosure does more than supply, and typically mix, the measured components of a multi-component coating system. The present dispensing system is a smart system, comprising a memory and processer or micro processor, capable of obtaining and analyzing environmental conditions at the site where the coating is being applied, monitoring performance and internal operational conditions of the dispensing system, such as temperature and viscosity of the resin system components being used, adjusting the mix ratio of the coating components if necessary based on the data provided from the monitoring systems, storing data from each run, documenting each run, and if desired, communicating with outside systems, e.g., internet systems, and the like.

The dispensing system of the disclosure comprises a control and analytical system integrated with a physical apparatus that moves the components of the resin system, for example, the dispensing system comprises: a base or platform supporting a means for pumping, and optionally mixing, at least two different components of a resin system, e.g., curable resin, hardener, etc.; one or more sensors to measure, e.g., factors such as temperature and humidity at the application site for the mixed coating, temperature of the coating components, viscosity and flow rates of the coating components and the mixed resin, and other use and performance criteria; and a controller that communicates with the sensors, operates the mixer, monitors operational, usage and environmental data from the sensors, uses the data to calculate optimum mix ratios for the coating system being employed, calculates the rates at which to drive pump motors to produce a mixed product at a specified ratio of resin to hardener, controls the motors driving the pumps to produce the correct mix ratio, and which may perform other function as found herein.

Monitoring multiple performance and environmental parameters allows the dispensing system to control precisely the ratio of, e.g., resin to hardener, providing a level of quality and consistency not previously attainable and prevents the production of a sub-quality product. The exemplary system(s) may also include safeguards and controls to assure that the correct resin and hardener are used, eliminating the potential for mis-matched resin and hardener, or incorrect product for the application.

In order to fine tune the dispensing ratio to assure product quality and to prevent the system from dispensing if a quality product cannot be assured, the system utilizes multiple types of sensors and feedback. These include:

Drive rate: The controller calculates the rate at which to drive the motors that power the system pumps. At the beginning of a dispense cycle, the motors are driven as calculated. During the dispense cycle, the controller receives actual motor drive rate data and compares the actual rate to the calculated rate. If there are discrepancies between the calculated rate and the actual rate, the system recalculates the drive rates to compensate for these discrepancies and adjusts the motor drive rates to compensate for the difference between the calculated and actual drive rates.

Environmental sensors: The controller receives environmental information from environmental sensors and determines if the component mix ratio should be adjusted for the current environmental conditions. The controller may recalculate a new component mix ratio, if needed, based on the actual environmental conditions. The controller may also determine whether the environmental conditions are within predetermined operating conditions and prevent the system from dispensing if the environmental conditions are outside of these predetermined operating conditions.

Actual usage: The controller receives actual resin and hardener usage data then compares the actual usage to the calculated usage. The controller may then recalculate the drive rates to compensate for discrepancies between actual and calculated usage. The usage data may be provided by any known devices or techniques for tracking usage of a component based on, for example and without limitation, a measured amount or change in volume, weight, and the like. Certain operational sensors as described in this disclosure may also serve as such usage trackers, i.e., to track and provide usage data.

Operational sensors: The controller receives operational data from operational sensors and compares the operational data to predetermined operating parameters. If necessary, the system recalculates drive rates to compensate for current operational conditions and adjusts the drive rates accordingly. The controller also may prevent the system from dispensing if altering the drive rates cannot compensate for the current operating conditions.

In some embodiments, the microprocessor-controlled dispensing system has capabilities for analytics and communication so that it may monitor and analyze usage and operational data and wirelessly communicate the information to a central location to be used for quality control, maintenance, accounting and other purposes. Additionally, the system may supply, for each project, a report outlining performance and certifying that product was produced to specification.

The system may be configured to prevent the dispensing of product at an incorrect ratio and may be further configured to produce a report certifying that mixed product was dispensed according to predetermined specifications.

The dispensing system is a portable device that may be located at the point of use, eliminating the time spent carrying product from a remote mix station to the workspace. The resin may therefore be mixed in real-time as needed, either in the dispensing system itself or in an outside container used to collect non-mixed, but measured resin components provided by the dispenser system. This allows for fewer manual functions and decreases necessary man-power and lowers labor costs. There are also fewer environmental and clean-up issues and less human contact with potentially harmful resinous chemicals. Product waste is minimized, and clean-up is greatly simplified.

In certain embodiments, the present dispensing system automatically mixes the coating components, e.g., resin and hardener in a precisely controlled ratio, and dispenses the mixed product. In one embodiment, the product is dispensed into a bucket. The product is poured from the bucket onto the floor and is then spread and rolled in a conventional manner. In another embodiment, the product is dispensed directly onto the floor and is then spread and rolled conventionally.

Currently, with a manual bucket and mixer system, an entire batch of product is mixed at one time. For example, 1 gallon of resin and one-half gallon of hardener are poured into a bucket and then mixed. As long as the total quantities of each component are within specification, the ratio of the mixed product will also be within specification. With an automated system, this becomes a real-time process. Mixing ends as product is dispensed, so the ratio must be controlled precisely as the components are pumped. With the advanced ratio control disclosed herein, the mixing system of the current disclosure may accurately control mix ratios, regardless of flow rates.

The mixing system disclosed herein may be utilized for applications other than floor coatings in which the accurate mixing and dispensing of multi-component coatings is required.

In one embodiment, the controller drives a first pump motor at a first calculated rate to provide a coating of a two component coating system, and a second pump motor at a second calculated rate to provide a hardener of a two component coating system to produce a mixture of the two components at a predetermined component ratio. In other embodiments, one or more additional pump motors drive one or more system pumps to deliver one or more additional components of a multi-component coating composition at predetermined ratios.

During use, the controller receives drive rate data from the pump motors in operation, compares the drive rate data from the pump motors in operation to the calculated drive rate and, if necessary, recalculates the drive rates to compensate for any detected discrepancies between the drive rate data from the pump motors in operation and the calculated drive rates. The controller also receives other operational data, e.g., temperature, viscosity, output, usage, etc., and environmental data, temperature, humidity etc., and, if necessary, recalculates new drive rates based on the conditions.

One exemplary embodiment of the system is illustrated in FIGS. 1A-3B. The dispensing system 100 in this embodiment is constructed on a base 101 that is shown here to roll on casters 102, but any means of assisting mobility of the system may be used. Motorized, hydraulic or other power assisted means may also be employed. A supply deck, e.g., for supplying the resin system components such as curable resin and hardener, 103 is mounted to the base 101 with stand-offs 104. This provides an upper deck or platform and lower deck or platform onto which all necessary operational components and product supply may be mounted.

Resin, hardener and other optional coating composition components may be conveniently supplied in separate supply reservoirs. In a simple two component coating system, resin and hardener may be separately supplied in individual reservoirs such as 105 and 106, which reservoirs may be mounted in a quick-release fashion to the supply deck 103. Additional reservoirs containing additional components that are pumped through and additional pumps may be accommodated by the dispensing system, but the discussion here focuses on a two component system for clarity. Each supply reservoir has a valve 107, 108 that connects to an upper manifold 109. The upper manifold fluidically connects the resin and hardener supply to input ports of two system pumps, 110 and 111, in a manner such that the resin supply connects to one pump and the hardener supply connects to the other pump.

The pumps are driven individually by electric motors 112, 113, which are connected to the pumps by couplings 114, 115, and propel fluid components within the system as described herein. The output ports of the pumps are connected to a lower manifold 116. The lower manifold directs the coating components, e.g., resin and hardener, from the pumps to the next system element, which next element may vary in different embodiments, to include, e.g., a system outlet, conduit, bucket, mixer, holding tank, the floor or surface being coated, etc. In the present embodiment, the lower manifold directs the coating components into a mixer coupler 117. Inside the mixer coupler the resin and hardener are combined. An output, in some embodiments an output tube, 118 connects to the mixer coupler. Inside the output, e.g., output tube, is a static mixer (not shown). Resin and hardener are thoroughly mixed within the static mixer, and the mixed product then exits the output and is ready to be spread onto the floor being coated. Other mixers, including active mixers, e.g., stirrers, vibrators, etc., may be employed.

In some embodiments, other optional components may be employed, e.g., a heater may be installed near or in one of the system components, which optional components may also be typically controlled by the controller.

The system is powered by a power source, and any convenient, safe source may be employed. In the illustrated embodiment, a battery 119 is used to power the system. A power cord (not shown) may be included that enables the battery to be recharged, and may alternately power the system from a line supply. Also shown is a control box 120 that may contain all electronics and controls necessary for operation of the system, as well as communications, analytics and any other functions. A user interface, not shown here, allows an operator to control all functions of the system.

The system may employ a variety of sensors. These sensors perform multiple functions and may be grouped by environmental sensors and operational sensors. Environmental sensors are used to measure environmental conditions that may have an impact on the dispensing, mixing and curing of the dispensed product. These sensors monitor, for example and without limitation, ambient temperature, humidity, barometric pressure, and temperature of a substrate or floor to be coated by the resin composition. Operational sensors are used to monitor the functional aspects of the dispensing system. These include, for example and without limitation, sensors that monitor temperature of the resin components, flow rate of the resin components, viscosity of the resin components, pressure within a reservoir, volume or weight within a reservoir, pressure of fluid streams in the system, pressure within the mixer, pressure at the pump head, and/or volume or weight of resin components dispensed.

Operational sensors may be used to identify the specific coating system components, e.g., resin and hardener, used in the system. This is very conveniently done when reservoirs containing the components are mounted onto the system as discussed above. The containers serving as reservoirs may be labeled with instrument readable markings, e.g., RFID, barcode or other suitable technology.

In one embodiment, low pressure sensors are mounted in each fluid stream in the upper manifold 109 to measure the head pressure of the resin and hardener within the supply reservoirs 105, 106. In another embodiment, high pressure sensors are mounted in the lower manifold 116 to measure output pressure. Temperature sensors may be included to measure the temperature of the components, the system flow streams, the ambient and/or floor temperature, and the like. Other environmental sensors may measure humidity, barometric pressure, etc. Location sensing (such as GPS), barometric pressure and other sensing may be included. In other embodiments, sensors that assist in determining whether the floor or surface to be coated is in an acceptable condition for coating are included.

A variety of sensors for environmental and operational measurements useful in the present disclosure are known, and any that are compatible with the operation of the dispensing system may be used. For example, temperature sensors include thermistors such as negative temperature coefficient (NTC) thermistors, resistance temperature detectors (RTD), thermocouples, semiconductor-based sensors, and many others.

Figure 2A:
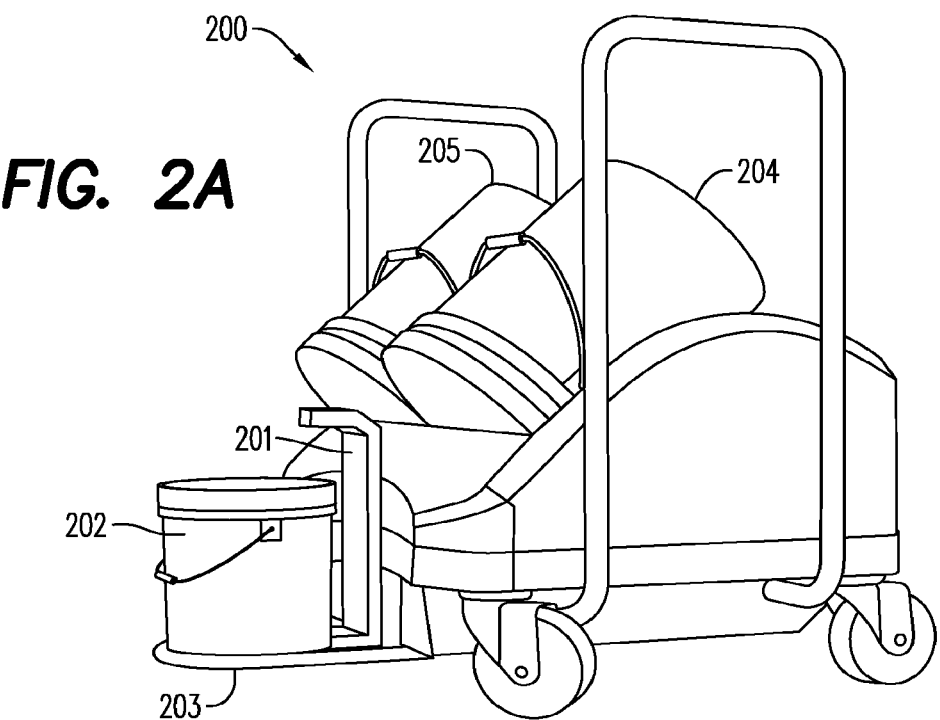
FIG. 2A illustrates an isometric view of an exemplary embodiment of the disclosed system in one mode.
Figure 2B:
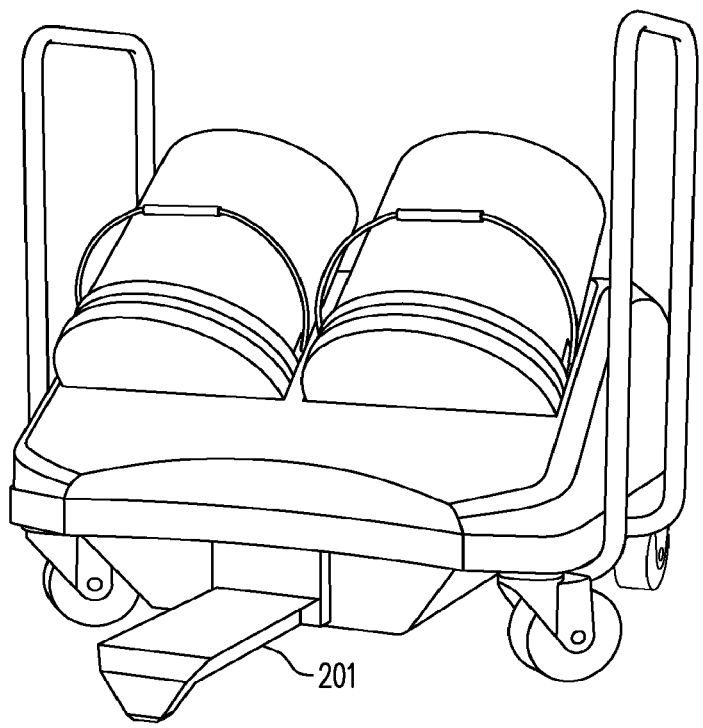
FIG. 2B illustrates an angle view of an exemplary embodiment of the disclosed system in one mode.

FIGS. 2A and 2B show an embodiment 200 of the current system that allows the system to dispense mixed product either into a bucket or directly onto the floor. In FIG. 2A, mixed product is dispensed from the end of an outlet tube 201 into a bucket 202. The bucket is then taken by the user and product is poured onto the floor to be coated and is then spread and/or rolled to a desired thickness. This embodiment includes a removable platform 203 that holds the bucket and acts as a drip tray to keep the floor under the system clean. In FIG. 2B, the platform 203 has been removed and the outlet 201 has been swiveled downward. In this configuration, mixed product may be dispensed directly onto the floor to be coated. The product is then spread and/or rolled to a desired thickness. In this embodiment, resin and hardener are supplied in 5-gallon buckets 204, 205, although, any appropriate size or container may be used.

The resin components, e.g., resin and hardener, may be provided in reservoirs in any convenient form, for example, in 5 gallon or other size buckets, plastic jugs, plastic bags, poly lined boxes, etc. In some embodiments the use of a disposable supply, such as a poly bag inside a box, may be preferable as it eliminates the need for clean-up of a permanent reservoir. However, a refillable reservoir may have advantages both environmentally and economically. The size of the reservoirs may be determined by factors such as the size of the floor to be coated, and the specific product being used. The relative volumes of resin and hardener may also determine reservoir size. For example, for a large floor the reservoir may be five gallons, while a small floor may require only one gallon. If the mix ratio is 2:1, the resin reservoir may be twice the size of the hardener reservoir. In some embodiments, individual and separated resin and hardener supplies may be contained in one supply reservoir.

Figure 6:
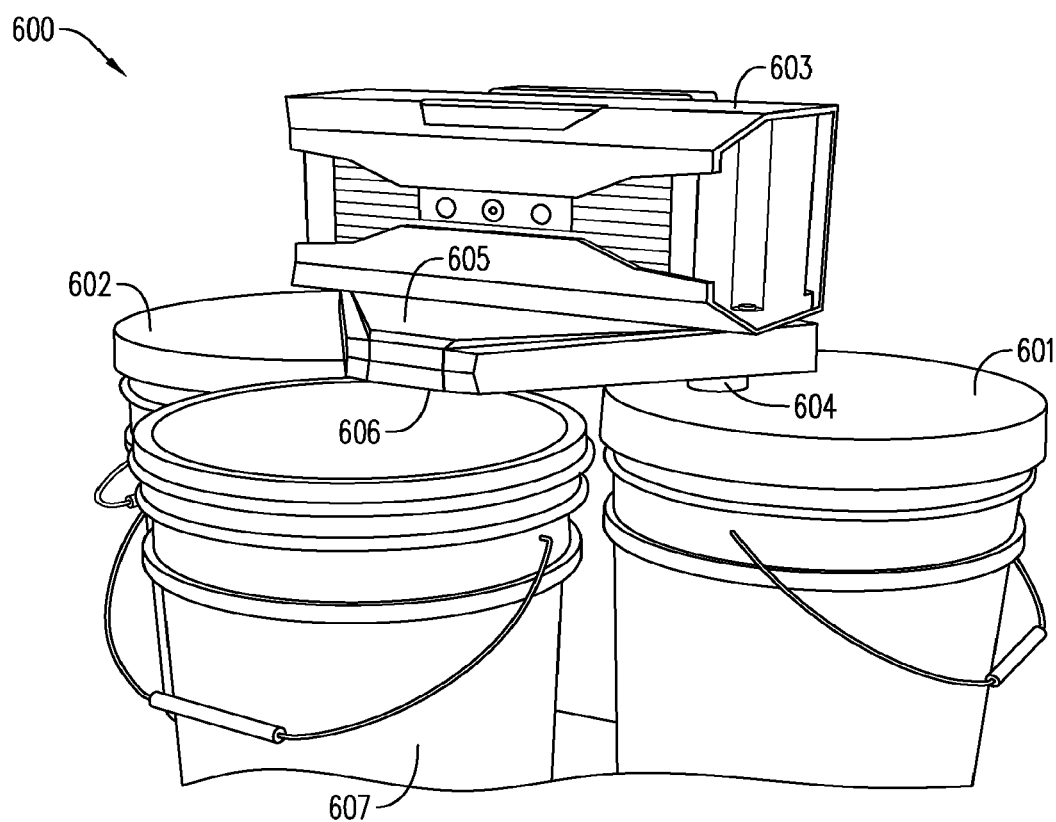
FIG. 6 illustrates an isometric view of an exemplary embodiment of the disclosed system; and, FIG. 7 schematically illustrates exemplary sensor and data usage.

In some embodiments, the supply reservoirs are placed below the system pumps rather than above. Placing the reservoirs below the pumps may provide some advantages, such as eliminating the need to lift and invert the reservoirs in order to place them onto the system. This may be easier for the operator to accomplish as the supply reservoirs may be more easily placed onto a low platform in an upright orientation. It also eliminates the need for reservoir valves (107, 108 in FIG. 1A). FIG. 6 shows a system 600 that illustrates this arrangement.

With reference to FIG. 6, supply reservoirs 601, 602 are placed onto a platform (not shown). The drive and control system 603 is then placed onto the reservoirs 601, 602 so that a pump inlet couples with each reservoir spout 604. A tube (not shown) extends from the pump inlet to the bottom of the supply reservoir 601, 602 to allow the pump to draw liquid resin and hardener components from the supply reservoirs 601, 602 with such drawing/sucking-type action as is well known in the operation of pumps. Such action of the pump for drawing liquid components from a reservoir is not limited to this embodiment and may be useful generally for efficient dispensation of fluid components. In this embodiment, inside the drive and control system 603 are the system pumps and motors, controller and various sensors. A line cord, not shown, supplies power to the system. In use, the system pumps draw resin and hardener from the supply reservoirs 601, 602, combine and mix them in the mixer 605, where the components are mixed into a homogeneous resin product. The mixed resin product exits the mixer outlet 606, is dispensed into the receiving bucket 607, and is now ready for use.

In the exemplary embodiment shown in FIG. 6, the supply reservoirs are shown as 5 gallon pails. As with the previously described systems, other forms of supply reservoirs may be used, for example, different sized pails, plastic jugs, poly lined boxes, etc. A system that places the pumps above the supply reservoirs may facilitate the use of larger supply reservoirs, such as 55 gallon drums, 275 gallon tote tanks, etc. When using these large supply reservoirs, the system may include tubes or hoses that connect the pumps to the reservoirs at a distance.

The system pumps 110, 111 may be any device suitable the pumping of resin components at the necessary pressure and flow rate. It is advantageous to use a positive displacement type pump such as a gear pump, gerotor, peristaltic or other such device. A positive displacement pump provides a fixed volume of liquid for every rotation of its drive motor and may be used to dispense precise volumes of resin and hardener. In many embodiments, gear pumps are used due to their accuracy and robustness. One such commercially available pump is model GP-F 10-61-P-C manufactured by Dynamic Fluid components, Inc. of West Union, SC. This pump delivers 6.1 ml of fluid for each revolution. For a floor coating application, the desired output of mixed product is generally in the range of 1.5 to 6 liters per minute.

The pumps 110, 111 are driven by electric system motors 112, 113. These motors may be of any suitable type having a torque and speed output compatible with the pumps and the desired output. A motor with an encoder allows the controller to run the motor at a precise speed to control the output of the pumps. Many useful motors are known that have advanced capabilities such as torque monitoring and control and the ability to provide feedback regarding usage and operational data to the controller. One such commercial motor is model CPM-SDHP-3441S-ELN manufactured by Teknik, Inc. of Victor, NY. This motor may produce a constant torque of 479 ounce-inches with a maximum speed of 840 RPM. This servo-controlled stepper motor may be regulated with a precision of 800 steps per revolution. Combined with the pump as described above that pumps 6.1 milliliters per revolution, this results in a resolution of less than 0.008 milliliters per step per pump. This allows accurate control over the ratio of resin to hardener.

In certain embodiments, the dispensing system of the disclosure not only delivers coating components in the desired ratio, but also mixes the coating components. Resin and hardener must be thoroughly mixed to insure proper curing of the final product. This is most conveniently accomplished in a passive way, i.e., involving no additional moving parts or motive forces. Static mixing nozzles, such as those used for mixing epoxy, are well known in the art. These devices are tubular in shape and contain an internal element that provides a tortuous path for the chemicals passing through. There are many internal element designs currently used in the art. Resin and hardener are pumped at their correct mixing ratio into the mixer, where they join and follow the tortuous path. The turbulence within the path join them into a homogenous mixture.

Figure 3A:
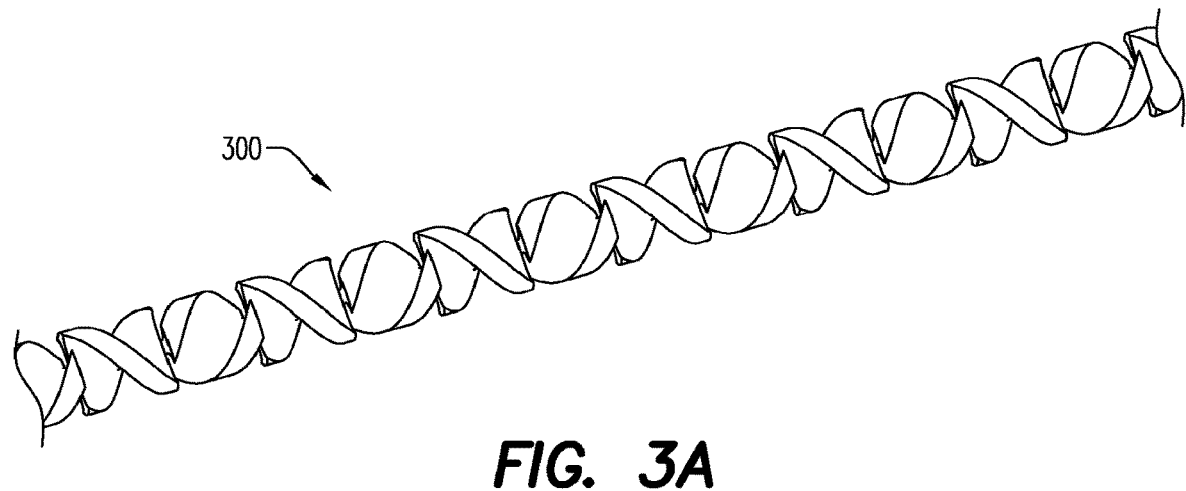
FIG. 3A illustrates a section of a static mixer element according to one embodiment.

The design of the mixing chamber may be chosen based on the types of resins used, difficulty of mixing, design preference and other factors. This may be a simple static device such as an empty chamber into which both components collide and mix, or may include a static mixing tube as is commonly used in epoxy mixing. In an exemplary embodiment, a static mixing tube is provided inside of an output tube 118, 201. FIG. 3A shows a section of one type of static mixer element 300 that may be used in the current system.

Figure 3B:
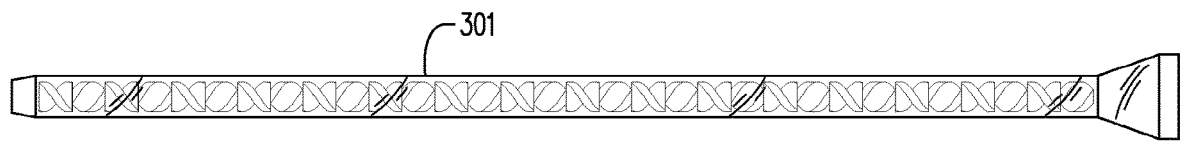
FIG. 3B illustrates a cross-section view of a static mixer element inside a supply tube.

Mixer elements of this type are available in various configurations, materials and sizes, depending on the desired flow rate and type and viscosity of fluids being mixed. For example, in embodiments of the disclosure employing as part of the output tube 118, 201, a device comprising a helical mixing element of approximately 9.5 millimeters in diameter and 200 millimeters in length, such as model HT-40-9.47-24-PP manufactured by StaMixCo LLC of Brooklyn, NY may be used. FIG. 3A shows a section of this element 300. FIG. 3B shows a cross section of the element within a tube 301. In another embodiment, an inline mixer is used which is readily discarded and replaced when it becomes clogged.

Figure 4:
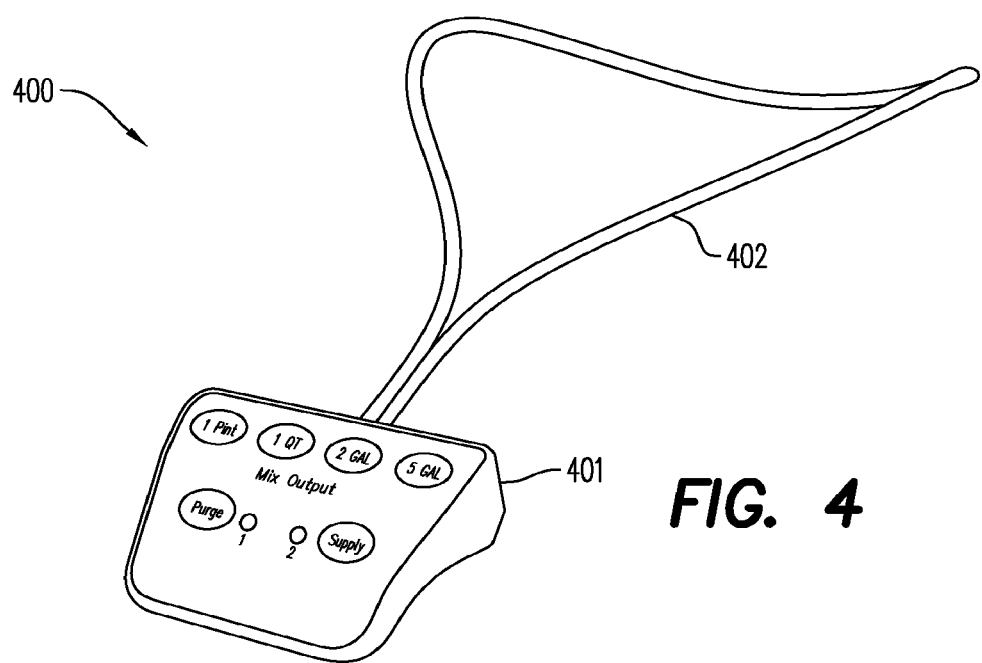
FIG. 4 illustrates a user interface according to one embodiment.

The dispenser system comprises a user interface that allows the operator to program the controller and thus control the output of the system. FIG. 4 shows one embodiment of a user interface device 400. This is a portable interface, easily transported by the operator that may, e.g., be worn by an operator as a pendent with the attached strap 402. This device may also contain a provision to mount it onto the operator's wrist. The interface panel 401 contains a limited set of control buttons. The operator may select operations such as choosing an amount of product to be mixed, and performing a purge when new resin and hardener supplies are mounted.

Interface devices for use with this system vary in form and complexity. These may comprise an on-board display including a keyboard or other input means. They may be located on the system cart or other convenient location. Alternately, a smart phone, tablet or other external means may connect via Bluetooth, WiFi, etc. and be used as the operator interface.

Some embodiments function using an interface with a limited number of simple functions, as seen with the interface of FIG. 4, but in other embodiments the interface comprises a wide array of simple and more advanced functionality. There is no limitation on the number and types of functionality comprised by the interface. For example, there may be two-way communication in which the interface provides status information and prompts the operator when it is ready to dispense, and may alert the operator to any issues that arise. In another example, the interface may notify the operator when there is a maintenance issue with the system, such as when it is time to replace the mixer element, or when a pump, motor or other device component needs replacement or attention.

In some embodiments, the operator may input information related to the ongoing project, such as when a coat has been completed, quality issues, etc.

In some embodiments, the interface may provide the operator with step by step instructions that guide the operator though a floor coating project, including which flooring products are to be used for primer and finish coats, as well as broadcast chips. It may keep track of curing time and notify the operator when it is time to start the next coat, as well as when a resin or hardener supply needs to be replaced.

Generally, the electronics and controls are contained within the control box 120. A controller is configured to manage and maintain all operations, statistical and usage information, and communications functions of the system. The controller, such as a processor and memory, may be in the form of a custom circuit board, PLC controller, embedded computer or other suitable control device. This controller may operate the pump motors and monitor and record data on motor operations. It may monitor sensors that may include pressure, temperature, humidity, viscosity sensors, etc. it may control any auxiliary functions such as heating elements.

Figure 5:
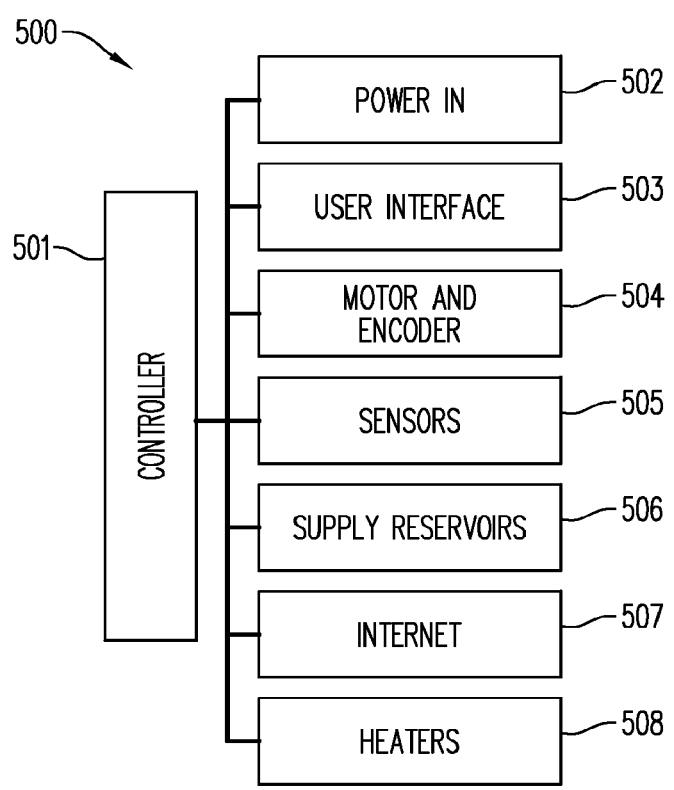
FIG. 5 illustrates a schematic view of an exemplary control system according to an embodiment.

Electrical and mechanical operations and communications functions are managed by the control system 500. FIG. 5 shows a schematic representation of many of the features that the control system may comprise. The controller 501 may be in the form of a custom circuit board, PLC controller, embedded computer or other suitable control device.

The controller is supplied power to operate the system 502. In most embodiments, the system is powered by a battery. This may be a sealed lead or other type of battery with enough capacity to power the controller, pumps and any other on-board devices for a sufficient period of time. This may be a large capacity battery that may last for an entire project, or a smaller, lighter weight battery that may be quickly replaced as necessary with fully charged ones as the project progresses. The system may also include a line cord that plugs into a standard electrical outlet to provide power. This may be used to recharge the battery, and to power the system if the battery lacks the capacity to do so.

The user interface 503 is used by the operator to control/program the functions of the system. In some embodiments, the operator may adjust the quantity of product output or increase or decrease the flow rate. In some embodiments the operator control means may include a display that may relay information to the operator concerning usage, low chemical alerts, operating instructions or other pertinent information.

The controller is connected to the motors 504 which drive the pumps. The controller sends power to the motors to move them a specified amount. The speed and amount of rotation of the motors is varied to control product output. An encoder attached to the motor gives feedback to the controller about actual performance.

Sensors 505 communicate with the control system. These may include temperature, humidity, barometric pressure and other sensors that monitor environmental conditions and are used to optimize the mix ratio and ensure that conditions are conducive to the production of coating product. If heaters are used, these sensors may be used to control the heater outputs and regulate the temperature. Pressure sensors may be included to measure pressures in one or more locations in the system. Flow meters may be utilized to measure the actual output from the pumps.

As suggested above, resin and hardener supply reservoirs 506 may include RFID, barcode or other suitable device so that they may be recognized by the controller. Information relayed may include chemical type, date of manufacture, batch number and other pertinent information. Product identification may be used to ensure that the resin and hardener that are being used are compatible. In some embodiments, the controller may be programmed with information about the floor coating project. In these cases, the system may ensure that the coating being used is correct for the application. In conjunction with the motor and other feedback, the controller may track the amount of each chemical that has been consumed and alert the operator when it is time to replenish it. Alternately or in addition, load cells may be used to weigh the supply reservoirs and determine both usage and remaining volume.

An internet connection 507 may be included. This may connect back to a central website, database, etc. and may be used for multiple tasks. For example, firmware and software updates may be downloaded and installed. Specific job instructions may be sent to the unit to assure that the correct resins and hardeners are being used. Usage and status reports may be generated and uploaded. Product identification may be monitored to assure that compatible resin and hardener are installed.

The system may include one or more heaters 508 below or surrounding the reservoir receptacle to bring the temperature of the resin and hardener to a preferred temperature. The heater may be of any convenient type such as a resistance heating mat.

In certain embodiments, the resin system used with the present dispenser system comprises at least two parts; an uncured polymer resin and a hardener (also known as a catalyst or curing agent). When hardener is added to the resin, a chemical reaction takes place that causes a cross-linking of the resin, commonly referred to as curing. The result is a thermoset polymer with favorable mechanical properties and high thermal and chemical resistance.

The ratio of resin to hardener may vary depending upon the type of resin used (epoxy, polyurethane, methyl methacrylate, etc.) as well as the specific chemical composition of the resin. Additionally, resins may be sensitive to temperature, humidity and other environmental conditions, which may change the effective ratio. In general, the ratio of resin to hardener for an epoxy resin must be within 15% of the cured product to retain the majority of its design properties. If the mix is resin rich, the finished product may be softer than as designed, since cross-linking is not complete, and cure time is extended. If the mix is hardener rich, the finished product may be brittle, and cure time is shortened. When coating a floor, the hardness and strength of the finished product is critical to the floor's wear properties. Cure time is important since most floor systems require multiple coats, and the process is time-based. Cure times that are too long or too short will negatively affect both the coating process and the finished product. Additionally, some coating products require that temperature and/or humidity must be within a predetermined range in order to cure properly, even when the mix ratio is correct.

Mix ratios may be expressed by weight or by volume. Due to differences in density between resins and catalysts the ratio by weight and the ratio by volume may be different. Due to practical considerations, manufacturers will often specify mix ratios by volume i.e. 1 gallon of resin and ½ gallon of hardener, since volume is easier to measure on site. Temperature may affect mix ratio, since resin and hardener may expand and contract different rates. When measuring by volume, this may influence the ratio. Additionally, some resins require that the mix ratio be adjusted for temperature to obtain optimum results. The system may include features that compensate for environmental conditions, component wear and other mechanical discrepancies and will prevent the system from producing any product if it cannot retain the optimum ratio or if environmental conditions are outside the product's specified range.

EXAMPLES

This illustrative example will use an epoxy resin product with a mix ratio of two parts of resin to one part of hardener. It may be seen, however, that any type of resin product and ratio may be used with this system.

The pump and motor combination as described above delivers 6.1 milliliters of resin or hardener for each revolution of the pump, which corresponds to 800 motor encoder counts. For a product output rate of 3 liters per minute, the system must output 2 liters of resin and 1 liter of hardener per minute. The following chart shows the volume (expressed in milliliters) and the corresponding pump revolutions and resulting encoder counts for a total product output of 3 liters per minute broken down by minute, second and 100 millisecond time increments.

|  | Per minute | | | Per second | | | Per 100 milliseconds | | |
| --- | --- | --- | --- | --- | --- | --- | --- | --- | --- |
|  | mL | revs | Encoder counts | mL | revs | Encoder counts | mL | revs | Encoder counts |
| Resin | 2000 | 328 | 262,295 | 33.3 | 5.5 | 4372 | 3.33 | 0.55 | 437 |
| Hard'r | 1000 | 164 | 131,148 | 16.7 | 2.7 | 2186 | 1.67 | 0.27 | 219 |
| Total output | 3000 | | | 50.0 | | | 5.0 | | |

When dispensing resin and hardener, the controller calculates, based on the desired output and mix ratio, the number of encoder counts per unit time necessary to obtain the correct quantity and rate of each component. The controller then drives the motors at that rate. To improve accuracy, the controller continuously monitors the encoders and makes any necessary corrections to assure that the drive rate is as desired.

Mixing and dispensing is a real-time process, so the greater the resolution of counts per unit time, the greater the accuracy that may be achieved. Referring to the chart above, the calculated number of encoder counts necessary to produce the desired 3 liters per minute flow rate are shown in minute, second and 100 millisecond increments. A controller with a microprocessor-based system has the capability to monitor and control motor output in increments of 50 milliseconds or less. This example will look at adjustments of 100 milliseconds. At 3 liters per minute, 5 milliliters of product is dispensed every 100 milliseconds. The controller runs the motors at rates of 437 counts and 219 counts per 100 milliseconds for the resin and hardener respectively. The motors feed back the actual counts to the controller. If, after 100 milliseconds, the counts are incorrect, the controller adjusts the output to obtain the correct count. The controller may theoretically control the output within +1 count resulting in a nominal accuracy for this 5 milliliter volume of +1.5% for resin and +3% for hardener. With this feedback system, the controller may tell whether the mix ratio is within its usable specification. If, for some reason, the controller is unable to keep the ratio correct, it may prevent the system from dispensing a substandard product until the fault is corrected.

The operation of the present dispensing system as described above is volumetric, meaning that each encoder count relates to a specific volume of product. The system may include the ability to correct for volumetric differences that occur due to temperature, as resin and hardener may expand and contract at different rates, or for resin chemistries that require mix ratios to be adjusted for temperature, to improve the quality and consistency of the finished product. Temperature sensors, such as thermistors, RTD sensors or other devices may be used to measure the temperature of any or all of the resin and hardener supply, the mixed product output, the ambient temperature or the temperature of the floor being coated. The controller may use this information to calculate volumetric adjustments that may be made to compensate for temperature and modify encoder count targets as needed.

Coatings may have a usable temperature range, outside of which they should not be used. If the temperature of the resin and hardener, ambient temperature and/or the floor temperature are outside of the usable range, the controller may prevent the system from producing product. In some embodiments, the system may include heaters to heat the resin and hardener supply to bring it into a usable or preferred temperature. Coatings may also have a usable humidity range, outside of which the product cannot cure properly. An onboard humidity sensor may be used to detect conditions outside of the range, and prevent the system from producing product.

Positive displacement pumps, although quite accurate at dispensing a fixed volume, are still subject to inconsistencies. Fluids of varying viscosities and densities, as well as temperatures, may affect volume output. Even with a new pump, there may be some internal leakage. As a pump wears with use, this leakage may increase. Left unchecked, these factors may influence the pump output, and therefore the mix ratio produced by the system. The system may include the ability to monitor actual resin and hardener usage, compare that to the calculated output, then modify the calculations to compensate. This may be achieved either by monitoring the flow output of each pump, or by measuring the weight of resin and hardener that is used.

An exemplary embodiment uses a low pressure, high accuracy pressure sensor located within the resin and hardener flow stream. These may be located within the upper manifold or in any convenient location between the supply and the pump. The pressure sensor may be of any suitable type that may accurately measure the pressure and is compatible with the chemicals being used. The sensor measures the head pressures produced by the resin and hardener. This head pressure relates directly to the heights, and therefore volume, of the resin and hardener in each supply reservoir. The exact geometry of the supply reservoirs is known and may be programmed into the controller. Also, the density of the specific chemistry being used is known. For example, the density of the resin may be 2.1 grams per milliliter, and the hardener may be 1.05 grams per milliliter. The volume remaining in the reservoir may now be calculated. Since the system may recognize the specific supply reservoir, reservoirs of different sizes and/or different chemistries may be used. The controller may use the geometry and density data for any recognized reservoir for the volume calculation.

In use, the controller takes a pressure measurement after each dispense cycle to determine actual usage and compares it to the calculated usage. The controller may modify the dispensing calculations for each of the resin and hardener based on the actual usage and in doing so, will increase the accuracy and consistency of the mix ratio. To increase the accuracy of the readings, the data may be averaged over multiple cycles. For example, before each dispense cycle, the controller may average the results of the prior 10 readings and adjust the calculation based on that average. Over time, this method will maximize the accuracy of the ratio calculations and compensate for any wear or mechanical issues. This allows the system to stay within specification for an extended period of time. If the function of the pumps, motors or dispenser systems deteriorates to the point the system may no longer compensate, the controller may prevent the system from dispensing an off-ratio product.

An alternative to measuring pressure is to include a load cell in the mounting system of the reservoirs and directly measure the weights of the reservoirs. The difference in weights divided by the density of the chemicals will determine the volumes of chemical used. As with pressure measurements, these volumes may be used to improve the accuracy of the calculations.

Another alternative is to utilize flow meters that measure the actual output of each pump. These are located between the pumps and the mixer, preferably immediately downstream of the pumps. As with pressure measurements, these volumes may be used to improve the accuracy of the calculations. Any compatible type of flow meter may be used; however, a helical or oval gear positive displacement device may be preferred. These are well suited to accurately measuring high viscosity fluids such as the resin and hardener used with this system.

The dispensing system generally includes diagnostic capabilities. By monitoring the onboard pressure sensors and motor feedback, the controller may analyze the system's operating conditions. The controller may use this information to make adjustments that keep the mix ratio correct, and to determine when it is time for replacement of consumable components such as resin, hardener and the static mixer.

For example, an increase in downstream pressure under normal operating conditions may indicate that the static mixer is becoming clogged. This increase in pressure will be accompanied by an increase in the motor torque required to drive the pumps at the desired flow rates. An increase in motor torque without an increase in downstream pressure may indicate that a pump may be malfunctioning.

With this system, if the motors have sufficient power to drive the pumps and produce the correct flow rate and mix ratio, dispensing operation may continue. With the ratio control feedback described above, the controller will know if the ratio and flow are correct, and if the system is functioning well enough to continue. If the system may no longer produce a correct mix ratio and flow rate, the controller may cease system operation and alert the operator and/or maintenance personnel.

Figure 7:
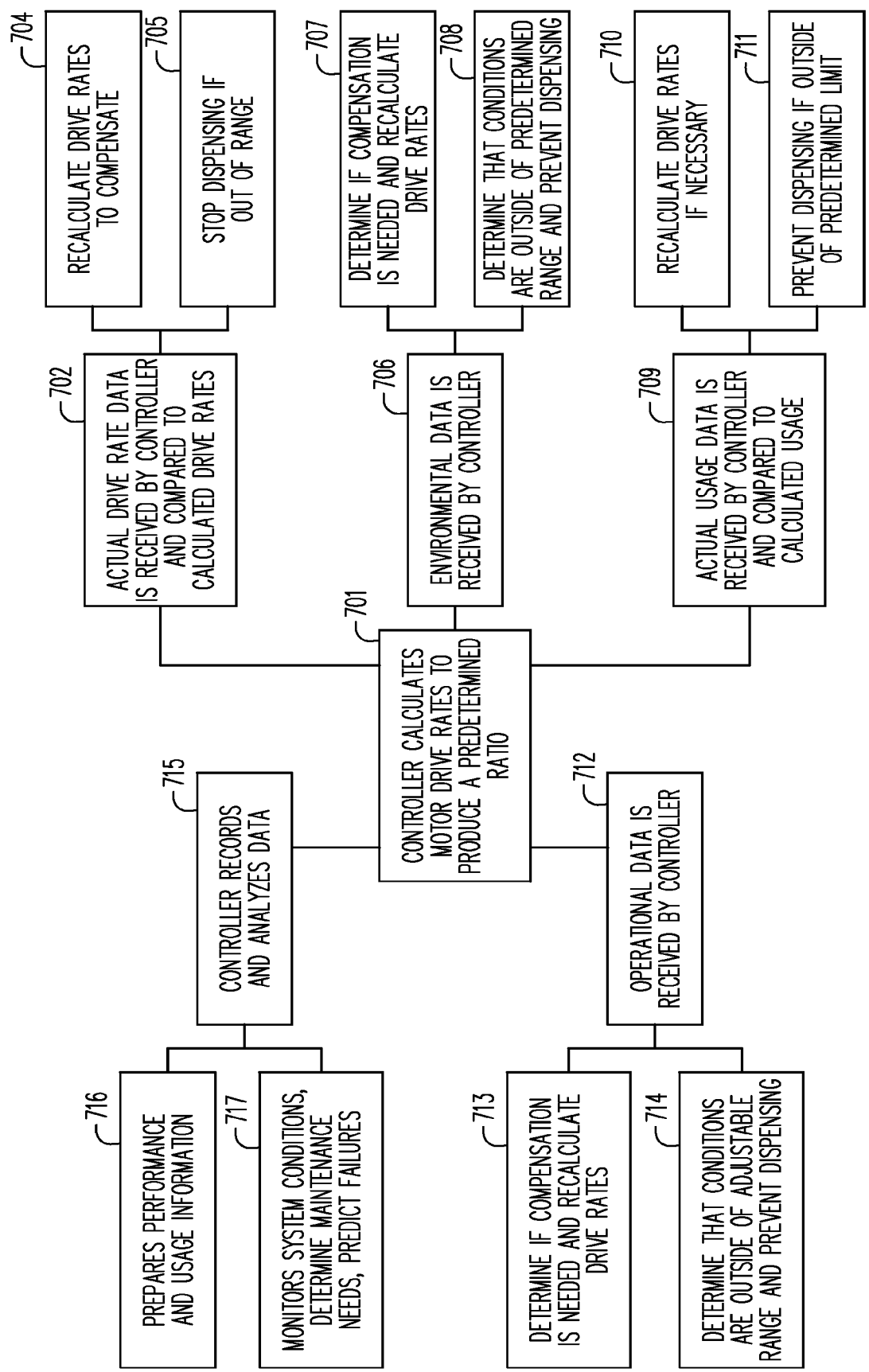

The controller uses the sensor inputs described above to fine tune the pump motor drive rates in order to produce a resin product that has a correct and accurate ratio of the various components being pumped. This information is also used to determine if product of the correct ratio may, in fact be produced by the system and if not, the controller will prevent the system from dispensing a less than optimal product. The controller may also analyze the received data to prepare reports and predict failures. FIG. 7 schematically illustrates these capabilities and processes.

With reference to FIG. 7, the controller calculates initial motor drive rates 701 that will produce the correct ratio of each component being pumped. As the motors are driven, actual drive rate data may be received by the controller 702. The controller compares the actual drive rates with the calculated drive rates in order to determine whether the motors, and therefore the pumps, are operating at the drive rates needed to pump the resin components at the correct ratio. If there is a discrepancy between the calculated and actual drive rates, the controller may recalculate 704 the drive rates needed to compensate for the discrepancy, then drive the motors at the new calculated drive rates. If the discrepancy between the actual and calculated drive rates of one or more of the motors is outside of a range that will allow a compensation to be effective, the controller will stop 705 the dispensing cycle and prohibit the system from producing an off-ratio product.

Before and during a dispensing cycle, environmental data 706 may be received by the controller. The controller then determines 707 whether the ratio of components should be altered in order to compensate for the environmental conditions. The controller will then recalculate the drive rates in order to produce a product at the altered ratios. If the controller determines 708 that any of the environmental conditions are outside of a predetermined range that will produce a quality product, the controller will prevent the system from performing a dispensing cycle.

Actual usage data 709 of the individual resin components may be received by the controller. This may be data that is collected during a single dispensing cycle, or data that is accumulated over multiple dispensing cycles. The controller compares the actual usage data with the calculated usage to determine any discrepancy between the quantity that has actually been dispensed and the quantity predicted by the calculated usage. If there is a discrepancy, the controller may recalculate 710 drive rates that will compensate for the discrepancy, then drive the motors at the recalculated rates. The controller may also prevent 711 the system from performing a dispensing cycle if the discrepancy is outside of a predetermined limit for indicating a system malfunction.

Operational data 712 may be received by the controller. This data indicates the condition of various functional aspects of the system. Some of the functions monitored by the operational sensors may affect the flow of resin components through the system. For example, a blocked conveyance, such as the tube 118 or valves 107, 108, due to a buildup of material may impede the flow of components through the system. The controller determines 713 if drive rate compensation is necessary and recalculates drive rates that will compensate for the conditions. If the controller determines 714 that operational conditions are outside of a range that is adjustable by altering drive rates, is will prevent the system from performing a dispensing cycle.

Each sensor input and controller compensation described herein allows the system to produce an increasingly accurate component ratio. This means that the quality of the final product may increase with each compensation that is used. The system may utilize any or all these data inputs and compensations. The sensors and data described herein are exemplary and do not limit the conditions, circumstances, or other parameters that may affect performance of a mixing and dispensing system as described herein. Particular applications of a mixing and coating system as described herein may involve specific performance-affecting aspects and the system may, to an extent consistent with this disclosure, measure and compensate for those aspects in a similar manner as described herein.

In an aspect, all of the data 715 that is received by the controller may be recorded and analyzed. The controller may compile the analyzed data as well as the results of compensation measures. The controller may then prepare 716 performance and usage reports and also monitor 717 system conditions to determine necessary maintenance actions and predict possible failures.

The system may include the ability to monitor motor performance and pressures over time and build a database of characteristics. As the database develops, the system will gain the ability to predict component failures. Individual systems may upload collected data to a central database, which may then be shared among other systems. This will allow a system controller to predict when a component, such as a pump is likely to fail and inform the operator or maintenance personnel that maintenance is necessary. Replacement of faltering components prior to failure will reduce failure-related downtime. This now becomes a maintenance rather than a repair function and may be completed during normal downtimes.

Information gathered by the controller may be saved and uploaded to a central computer. This information may include the quantity of resin and hardener used as well as that of other consumables, the amount of time expended for each step of the process, identities of the crew members who performed the tasks, as well as detailed process data regarding temperatures, pressures, flow rates, etc.

An additional benefit is that, based on the onboard data collection and feedback from the operator, the system may record the time each step takes, how much product was used to coat the floor and other valuable information. The company may use this information to compare quoted time and materials to actual performance. The results may be used to improve project quotations, understand and compare the efficiency of project teams, etc.

This data may be analyzed and used for multiple purposes such as quality control, accounting, and product and process improvements. For example, actual usage may be compared to predicted usage. Team efficiency may be evaluated. Project work flow may be analyzed and used to improve coating processes. Process data may be used to assure that the equipment is functioning correctly.

The data obtained during operation may be stored and analyzed to produce performance and usage information for each project. This may include, but is not limited to:

The amount of resin and hardener consumed during the project. When compared to the area of the project, this will indicate whether the correct amount of material was used to produce a coating of the desired thickness;

The types of resin and hardener and sequence of their use as determined by the identification system. This may be used to ensure that the resin and hardener are compatible and are of the correct type for the application;

The actual ratio of resin to hardener obtained during dispensing cycles. This indicates whether the mix ratio is within specification. Ratios may be expressed as an average and standard deviation, as a graph or chart of ratio vs. time, ratio vs. volume, etc., or in any other convenient format;

Environmental conditions, i.e. temperature and humidity. This demonstrates that conditions were favorable during dispensing and application to produce a final product that meets the product's design specification; and, Elapsed time between dispensing and completion of spreading the product onto the floor. This will determine if the product was spread within the product's designated working time. Elapsed time may be determined by the time between dispensing cycles, or by an input by the operator when spreading is completed.

The information collected may also be used for inventory control, billing, quality control and process improvements and other applications. Reports may be generated for use by customers, management and others.

In some embodiments, this information may be in the form of a certification. The system may produce a document that certifies that environmental conditions, mix ratio, type and quantity of product and application timing, as well as other variables are all within the predetermined specifications for the product application.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A multi-component coating dispensing system, comprising:
   a first pump in fluid communication with a first reservoir containing a first coating component, the first pump configured for propelling at a first specified drive rate the first coating component received at an inlet of the first pump;
   a second pump in fluid communication with a second reservoir containing a second coating component, the second pump configured for propelling at a second specified drive rate the second coating component received at an inlet of the second pump;
   a controller configured for determining the first specified drive rate and the second specified drive rate based at least in part on providing from the first pump and the second pump a desired ratio of the first coating component to the second coating component;
   a dispenser outlet for dispensing the first coating component and the second coating component in the desired ratio; and,
   a usage tracker configured for providing to the controller actual usage data for the first coating component and the second coating component, wherein
   the controller is configured for comparing the actual usage data to a corresponding calculated usage for the first coating component and the second coating component, and
   the controller is configured for at least one of determining an adjusted drive rate for at least one of the first pump and the second pump for providing to the dispenser outlet the desired ratio of the first fluid component to the second fluid component, and preventing the dispenser outlet from dispensing, based at least in part on comparing the actual usage data to the corresponding calculated usage for the first coating component and the second coating component.

2. The system of claim 1, further comprising a portable deck, wherein the first pump, the first reservoir, the second pump, and the second reservoir are supported on the portable deck such that the first pump, the first reservoir, the second pump, and the second reservoir are together portable to different locations.

3. The system of claim 1, wherein at least one of the first reservoir and the second reservoir are positioned respectively below the first pump and the second pump, and the corresponding first coating component and second coating component are drawn respectively from the first reservoir and the second reservoir by action of the respective pump.

4. The system of claim 1, wherein at least one of the first reservoir and the second reservoir are positioned respectively above the first pump and the second pump, and the corresponding first coating component and second coating component are delivered respectively to the inlet of the first pump and the second pump at least in part by gravity.

5. The system of claim 1, wherein the first pump and the second pump respectively propel the first coating component and the second coating component in the desired ratio to a mixer.

6. The system of claim 5, wherein the mixer is configured for mixing the first coating component and the second coating component in the desired ratio and dispensing a mixture of the first coating component and the second coating component in the desired ratio.

7. The system of claim 1, wherein
   the first pump is configured for providing a first actual drive rate to the controller and the second pump is configured for providing a second actual drive rate to the controller,
   the controller is configured for comparing the first actual drive rate to the first specified drive rate and the second actual drive rate to the second specified drive rate, and
   the controller is configured for at least one of determining an adjusted drive rate for at least one of the first pump and the second pump for providing the desired ratio of the first fluid component to the second fluid component, and preventing the dispenser from dispensing, based at least in part on comparing the first actual drive rate to the first specified drive rate and the second actual drive rate to the second specified drive rate.

8. The system of claim 1, further comprising
   an environmental sensor configured for providing to the controller environmental data regarding at least one environmental condition, wherein
   the controller is configured for at least one of determining an adjusted drive rate for at least one of the first pump and the second pump for providing to the dispenser outlet the desired ratio of the first fluid component to the second fluid component, and preventing the dispenser outlet from dispensing, based at least in part on the environmental data.

9. The system of claim 1, further comprising
   an operational sensor configured for providing to the controller operational data for at least one operational aspect of the system, wherein the controller is configured for comparing the operational data to a corresponding predetermined operational parameter for the operational aspect, and the controller is configured for at least one of determining an adjusted drive rate for at least one of the first pump and the second pump for providing to the dispenser outlet the desired ratio of the first fluid component to the second fluid component, and preventing the dispenser outlet from dispensing, based at least in part on comparing the operational data to a corresponding predetermined operational parameter for the operational aspect.

10. The system of claim 1, wherein the controller includes at least one of a processor and a memory, and the controller is configured for at least one of storing data, reporting data, and analyzing data regarding at least one of drive rates, environmental conditions, usage of mixing components, and operational parameters of the system.

11. A method for dispensing a multi-component coating, comprising:

setting, with a controller, a first specified drive rate for a first pump and a second specified drive rate for a second pump;

placing a first reservoir containing a first coating component in fluid communication with the first pump and a second reservoir containing a second coating component in fluid communication with the second pump;

propelling at the first specified drive rate the first coating component received at an inlet of the first pump;

propelling at the second specified drive rate the second coating component received at an inlet of the second pump, wherein setting the first specified drive rate and the second specified drive rate is based at least in part on providing from the first pump and the second pump a desired ratio of the first coating component to the second coating component;

propelling the first coating component and the second coating component in the desired ratio to a dispenser outlet for dispensing the first coating component and the second coating component in the desired ratio;

transmitting to the controller, from a usage tracker, actual usage data regarding actual usage for the first coating component and the second coating component;

comparing, with the controller, the actual usage to a corresponding calculated usage for the first coating component and the second coating component; and, at least one of adjusting, via the controller, at least one of the specified drive rate for the first pump and the specified drive rate for the second pump, thereby changing the corresponding first actual drive rate and second actual drive rate for providing the desired ratio of the first fluid component to the second fluid component, based on a discrepancy between the respective actual usage and calculated usage, and preventing, via the controller, the dispenser outlet from dispensing, if the discrepancy is outside of a predetermined range.

12. The method of claim 11, further comprising propelling the first coating component and the second coating component in the desired ratio to a mixer.

13. The method of claim 12, wherein the mixer is configured for mixing the first coating component and the second coating component in the desired ratio and dispensing a mixture of the first coating component and the second coating component in the desired ratio.

14. The method of claim 11, further comprising transmitting a first actual drive rate of the first pump and a second actual drive rate of the second pump to the controller;

comparing, with the controller, the first actual drive rate to the first specified drive rate and the second actual drive rate to the second specified drive rate; and at least one of adjusting, via the controller, at least one of the specified drive rate for the first pump and the specified drive rate for the second pump, thereby changing the corresponding first actual drive rate and second actual drive rate for providing the desired ratio of the first fluid component to the second fluid component, based on a discrepancy between the respective actual drive rate and specified drive rate, and preventing, via the controller, the dispenser outlet from dispensing, if the discrepancy is outside of a predetermined range.

15. The method of claim 11, further comprising transmitting to the controller, from an environmental sensor, environmental data regarding at least one environmental condition; and, at least one of adjusting, via the controller, at least one of the specified drive rate for the first pump and the specified drive rate for the second pump for providing the desired ratio of the first fluid component to the second fluid component, based at least in part on the environmental data, and preventing, via the controller, the dispenser outlet from dispensing, if the environmental condition is outside of a predetermined range.

16. The method of claim 11, further comprising transmitting to the controller, from an operational sensor, operational data for at least one operational aspect of the system;

comparing, with the controller, the operational data to a corresponding predetermined operational parameter for the operational aspect; and at least one of adjusting, via the controller, at least one of the specified drive rate for the first pump and the specified drive rate for the second pump, thereby changing the corresponding first actual drive rate and second actual drive rate for providing the desired ratio of the first fluid component to the second fluid component, based on a discrepancy between the operational data and the predetermined operational parameter, and preventing, via the controller, the dispenser outlet from dispensing, if the discrepancy is outside of a predetermined range.

* * * * *